US011194932B2

(12) United States Patent
Sinha et al.

(10) Patent No.: US 11,194,932 B2
(45) Date of Patent: Dec. 7, 2021

(54) CIVIL PROJECT AND MATERIALS MANAGEMENT ON A BLOCKCHAIN

(71) Applicant: International Business Machines Corporation, Armonk, NY (US)

(72) Inventors: Shantanu Sinha, Kolkata (IN); Proshanta Sarkar, Kolkata (IN); Santanu Mitra, Kolkata (IN); Diptiman Dasgupta, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 16/001,503

(22) Filed: Jun. 6, 2018

(65) Prior Publication Data

US 2019/0377904 A1 Dec. 12, 2019

(51) Int. Cl.
*G06F 21/00* (2013.01)
*G06F 21/64* (2013.01)
*H04W 4/38* (2018.01)
*H04L 9/06* (2006.01)

(52) U.S. Cl.
CPC .......... *G06F 21/64* (2013.01); *H04L 9/0637* (2013.01); *H04W 4/38* (2018.02); *H04L 2209/38* (2013.01)

(58) Field of Classification Search
CPC ... G06F 21/64; H04L 9/0637; H04L 2209/38; H04W 4/38
See application file for complete search history.

(56) References Cited

U.S. PATENT DOCUMENTS

| 6,298,632 | B1 | 10/2001 | Sherwood |
| 8,534,028 | B2 | 9/2013 | Wojtusik et al. |
| 2010/0082157 | A1* | 4/2010 | McGarel ............. G05D 11/132 700/265 |
| 2017/0232300 | A1 | 8/2017 | Tran et al. |
| 2017/0307387 | A1* | 10/2017 | Kohlhepp ............. G06Q 50/18 |
| 2018/0069899 | A1 | 3/2018 | Lang et al. |
| 2018/0096175 | A1* | 4/2018 | Schmeling ............ G06Q 10/08 |
| 2018/0255381 | A1* | 9/2018 | Cella .................... G06N 3/0427 |
| 2019/0318329 | A1* | 10/2019 | Castinado .............. H04W 4/38 |

OTHER PUBLICATIONS

Si Chen, Rui Shi, Zhuanyu Ren, Jiaqi Yan, Yani Shi and Jinyu Zhang, "A Blockchain-based Supply Chain Quality Management Framework", The 14th IEEE International Conference on e-Business Engineering (ICEBE), Nov. 2017, pp. 172-176. (Year: 2017).*
Anonymously; "Method, System and Computer Program Product for Energy Conservation Best Practice Management": http://ip.com/IPCOM/000198978D; Aug. 19, 2010.

(Continued)

*Primary Examiner* — Joseph P Hirl
*Assistant Examiner* — Chi D Nguy

(57) ABSTRACT

An example operation may include one or more of receiving sensory data, identifying one or more operations in a smart contract stored on a blockchain, performing the one or more operations based on the sensory data received, creating a blockchain transaction with a record of the one or more operations performed and the sensory data received, and committing the blockchain transaction to the blockchain.

17 Claims, 13 Drawing Sheets

(56) References Cited

OTHER PUBLICATIONS

Deshpande, A. et al.; "Understanding the Landscape of Distributed Ledger Technologies/Blockchain—Challenges, opportunities, and the prospects for standards"; RAND, Europe, www.rand.org/randeurope . . . British Standards Institution (BSI); 2017.

IBM; "Method of creating a componentized architecture for unifying resource sharing scenarios in Cloud Computing environment"; http://ip.com/IPCOM/000193146D; Feb. 11, 2010.

IPCOM000219950D; "Improve Productivity with Construction-Driven Project Management"; http://ip.com/IPCOM/000219950D; Jul. 18, 2012.

\* cited by examiner

CIVIL PROJECT AND MATERIALS MANAGEMENT ON A BLOCKCHAIN

TECHNICAL FIELD

This application generally relates to materials management, and more particularly, to using sensory information to manage mixing and other materials management operations for a civil project via a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, civil projects often include materials mixing, such as concrete and asphalt preparation for pouring and molding to create roads, structures and other fixtures. Integrity, safety and quality are important considerations when managing such projects. The projects can be expensive and can also affect human lives when the procedures are not performed to a certain level of integrity. Also, providers of materials may save on costs by providing sub-quality materials which are not always checked during each step of an ongoing project. Material composites, mixing processes and other project operations should be consistent for any civil project. For example, a road may be constructed by various different vendors, one vendor may use different quality materials than another, which creates an inconsistency in the road construction process. Materials and the mixing processes should be the same and should be performed according to a particular specification. The shared ledger infrastructure of a blockchain may provide data management architecture that supports ongoing civil projects and related project management efforts.

SUMMARY

One example embodiment may provide a method that includes one or more of receiving sensory data, identifying one or more operations in a smart contract stored on a blockchain, performing the one or more operations based on the sensory data received, creating a blockchain transaction with a record of the one or more operations performed and the sensory data received, and committing the blockchain transaction to the blockchain.

Another example embodiment may include an apparatus that includes a receiver configured to receive sensory data, and a processor configured to identify one or more operations in a smart contract stored on a blockchain, perform the one or more operations based on the sensory data received, create a blockchain transaction comprising a record of the one or more operations performed and the sensory data received, and commit the blockchain transaction to the blockchain.

Yet another example embodiment may include a non-transitory computer readable storage medium configured to store instructions that when executed cause a processor to perform receiving sensory data, identifying one or more operations in a smart contract stored on a blockchain, performing the one or more operations based on the sensory data received, creating a blockchain transaction comprising a record of the one or more operations performed and the sensory data received, and committing the blockchain transaction to the blockchain.

DETAILED DESCRIPTION

Figure 1A:
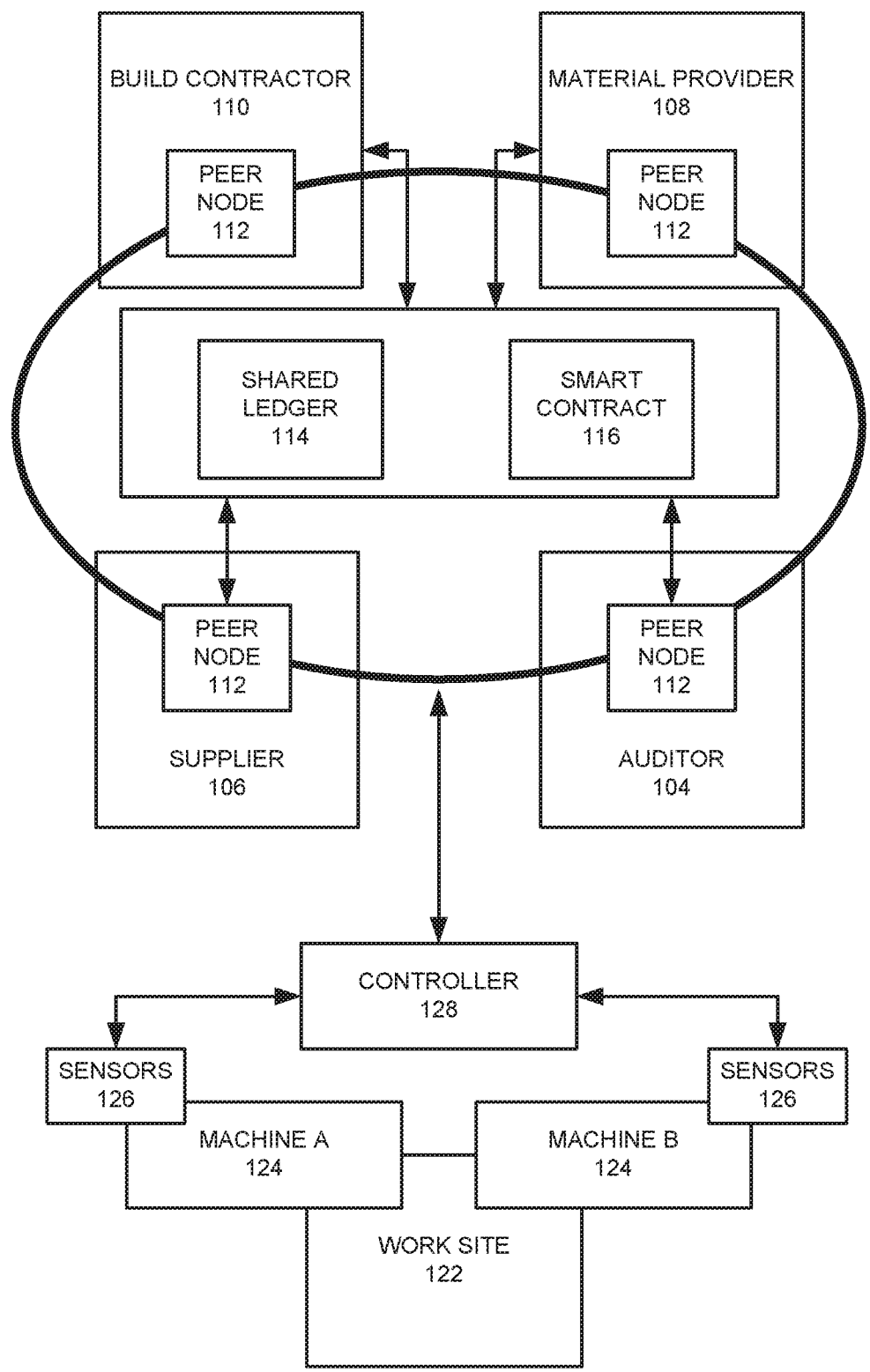
FIG. 1A illustrates a civil project management architecture on a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide for maintaining accurate and updated records with regard to large-scale civil projects. Sensory data may be captured in an ongoing process based on sensors placed in on-site and/or off-site locations which are the fundamental locations used to initiate material mixing and installation efforts. The sensors may provide data which is then compared to known local, government, corporate, contractual and other standards in an effort to determine whether compliance or non-compliance has occurred. The results of the comparison are performed and maintained by a smart contract setup to execute comparisons and create new blockchain transactions for committal to the blockchain ledger.

A civil project has various entities participating in a joint effort to construct various structures, such as buildings, roadways, bridges, tunnels, etc. Such projects have materials, such as concrete, asphalt, metal, wood, plastic, etc., many of which are prepared on-site according to guidelines and specifications. The entities responsible for ensuring compliance may have to audit the information collected at various times throughout the project cycle. In one example, a composite may be created by mixing several substances at a particular substance ratio. The desire to ignore rules and regulations to save resources and increase profit may result in a failure of a component part of a building or structure, which causes damage to a person or property, usually resulting in harm to the owner. For instance, in a road construction scenario, a proper mixing ratio of all the materials used in the roadway must be maintained throughout the whole construction effort. One road might be constructed by various vendors that may mix at different substance ratios. The shared ledger architecture of the blockchain may be used to receive information before, during and after the construction efforts, such as by recording a ratio of the construction elements mixed throughout the whole road construction effort, and also whether any vendor has performed any kind of fraudulent activity by mixing different quality materials.

In one example, a system and method may be used which combines wireless communication via an Internet of things (IOT) protocol and medium to communication status and metric data information to the blockchain to ensure any material composite, such as mixing of several substances at a particular ratio, and overall consistency is maintained for any civil project. The blockchain will provide transparency for the project data assets, in this case the transparency will be primarily for inventory records. This approach also provides immutability on the mixing ratio records by which the auditor of the blockchain records can very identify fraud with regard to the quality of the construction efforts.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1A illustrates a civil project management architecture on a blockchain, according to example embodiments. Referring to FIG. 1A, the blockchain architecture 100 includes a shared ledger 114 maintained and managed by the peers nodes 112, which represent blockchain members, such as the entities associated with a civil project. Those entities may include a building contractor 110, a material provider 108, a supplier 106 and/or an auditor 104, which is responsible for managing the project activities and ensuring compliance with standards and agreements. An on-site work site equipment entity 122 may include machines A and B—124, which may be rigged with sensors to track movement, chemical compositions, temperature, time, and other data metrics, which can be forwarded via a communication protocol, such as Internet of things (IoT) to the blockchain shared ledger 114. The data may be processed via the smart contract 116 according to a chaincode of instructions setup to process the data sensor metrics and determine whether the data is accurate according to a baseline level of compliance. The sensors 126 may measure and transmit data to a controller 128, which forwards the data to the blockchain architecture for management via the smart contract 116 and committal to the ledger as blockchain transactions.

This configuration includes a network in the blockchain involving all stakeholders to the project, such as the build contractor 112, material provider 108, supplier 106, and auditor 104. All the machines, such as a concrete mixing machine, conveyer belt device, etc. IoT enabled. The IoT devices may continuously transmit sensory data to protect from tampering or sub-standard material processing. In case of a transmission loss, the same sensory event will be logged in the blockchain network as a blockchain transaction and the identified machine(s) could be barred from the network and the construction site, if identified as being non-compliant. Upon inspection and certification via the auditor, any machine can be reinstated to the network. The material ratio, mixing conditions, such as a number of rotations, temperature, etc., will be transmitted to and captured in the blockchain as received from the sensors, which are co-located with the machines.

Figure 1B:
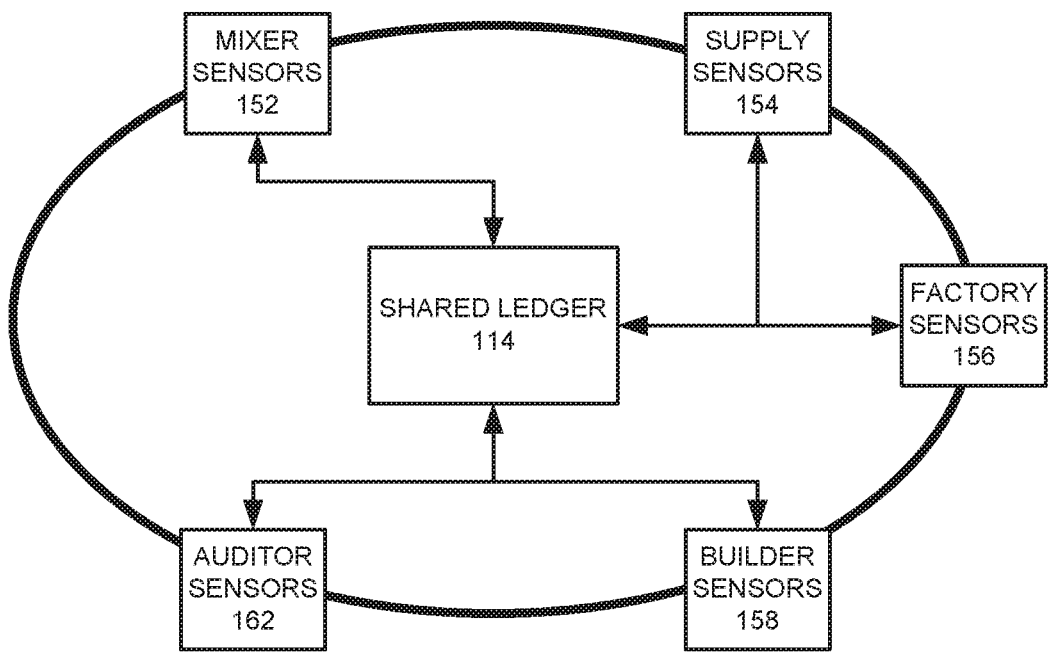
FIG. 1B illustrates a group of entities associated with a civil project operating on a blockchain, according to example embodiments.

FIG. 1B illustrates a group of entities associated with a civil project operating on a blockchain, according to example embodiments. In FIG. 1B, the entity network 150 includes the sensors of the mixer entity 152, a material supply entity 154, a factory 156, a builder 158 and an auditor 162. All of those entities may be part of an ongoing civil project and may query and/or contribute information to a project's lifecycle. The information may be stored in the shared ledger 114 of the blockchain. Once the data is logged and committed to the blockchain, a consistency report can be generated during and/or post construction efforts. In case of any accident, the report can be studied to find the ownership or cause of the fault and action which should be taken. The ledger is a tamperproof near real-time multiparty consistency ledger, which will enable transparent material consistency throughout any large construction project.

Figure 1C:
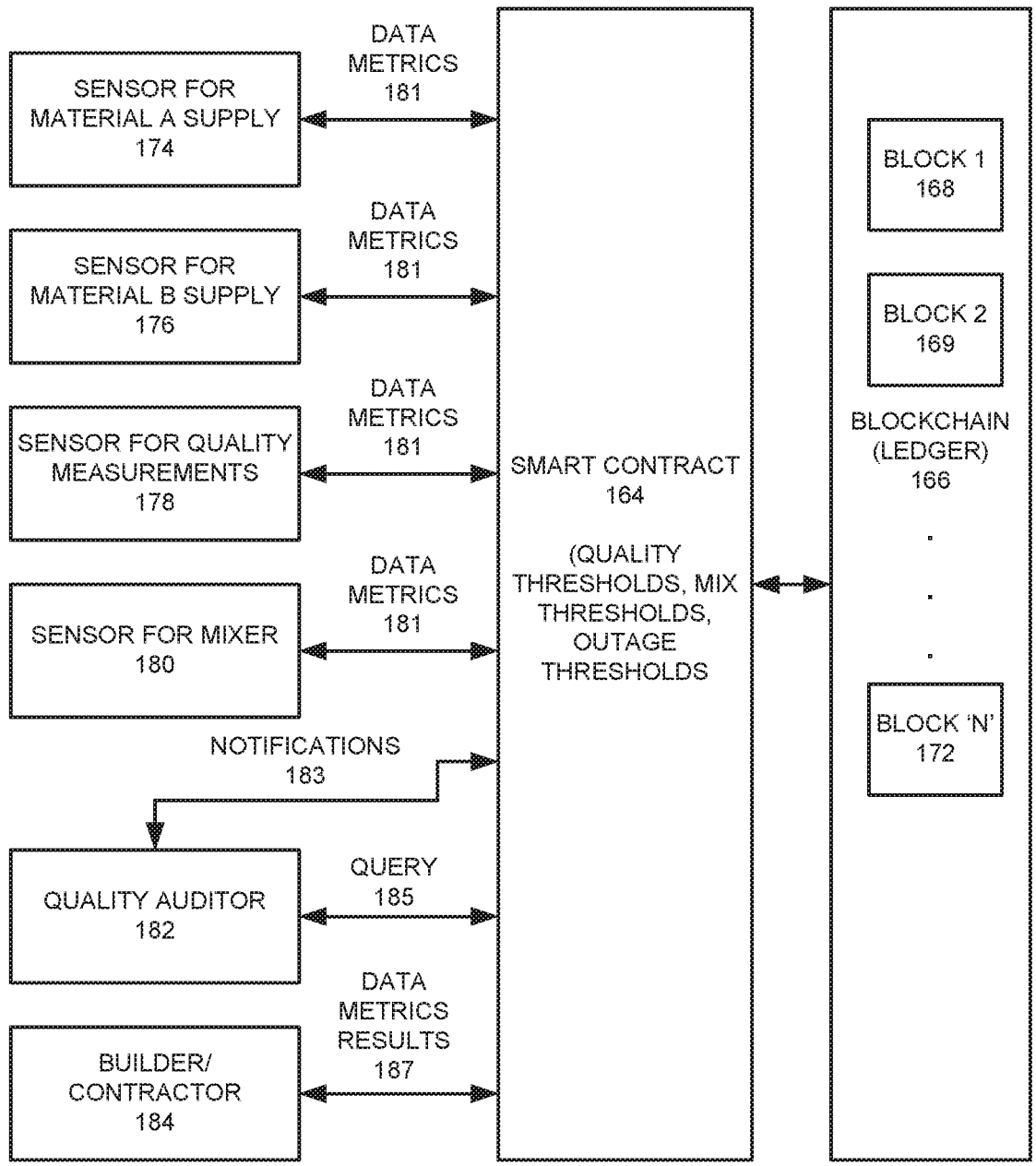
FIG. 1C illustrates a logic diagram of a data flow between entities associated with a civil project and a blockchain, according to example embodiments.

FIG. 1C illustrates a logic diagram of a data flow between entities associated with a civil project and a blockchain, according to example embodiments. Referring to FIG. 1C, the diagram 170 includes an example of information sharing between project entities and the blockchain. In this example, there may be several material providers which are rigged with sensors 174 and 176, along with sensors for quality measurement entities 178 and mixers 180, all of which provide data metrics 181 to a smart contract 164, which processes the data according to the instructions in the smart contract, such as comparing the data metrics received to threshold levels, performing logic operations to determine whether the data is acceptable or is unacceptable according to a particular set of standards, thresholds, etc. The project data that is identified is stored in blocks 168, 169 . . . 172 in an ongoing process. Any disruptions, invalid data and/or violations of standards may cause the smart contract to create an alert or notification 183 to notify the appropriate parties. A quality auditor 182 may be notified if a mixture of materials is not created according to a particular standard, etc. The quality auditor 182 may submit a query 185 to the blockchain 166 in order to check such information against current standards. The builder/contractor 184 may submit/receive data metric results 187, which summarize the project information and indicate the level of compliance.

There may be IoT sensors in every mixing machine to identify the elements/materials and their ratios as included in the mix. All the inventory records will be stored in the shared ledger. The sensors placed in the mixing machines will sense the elements, quality of those elements and the associated mixing ratios. Then, the system may cross-check from the ledger inventory data, the element ratios needed to construct the project, and if the requirements are not met, a notification is created and sent to an authority, and the transaction is recorded in the shared ledger 166. There might be a tolerance buffer/delta margin percentage due to cleanliness of the machine etc., and other variables which require a deviation in the measurements so as not to indicate a failure when the expectations are not met. If a mixing process crosses the tolerance limit (i.e., 5%, 10%, etc.), that will cause a notification to be sent to the appropriate authority and a transaction to be recorded to the ledger.

In one specific example, a conveyor belt measurement configuration may use a quantitative determination. For example, different gates may be used for sand, cement and stone-chips, during an assembly and mixing process, which are routed towards a mixing machine. Different cut-off weight levels are set on the conveyor belt to determine the ratio in terms of weight. The IoT type of network configuration may be used for measuring the weights of the materials and transmitting those readings to the controller. When sands are filtered for elimination of chunks, stones, mica, soil and/or salt, the filtering plate may be set to a cut-off weight for an acceptable level of a maximum amount of larger stones, organic impurities and mica in the sand bags. The reading obtained by the sensors may be transferred to the remote controller system and/or gateway over a WiFi communication medium.

In another layer of material processing, semi-filtered sand contents should be passed from a water container and the water should be drained. The water may dissolve the soil and salt and finally the 'purified' sand will be transferred into the mixing machine based on the acceptance criteria identified in the smart contract, or else, a message may be created and sent from the gateway to the appropriate party. Acceptance criteria may also be based on the material processing layers and/or the density of the water, as measured. The drained water can be tested via an industry level liquid density sensor and measured based on a cut-off criteria of its particular composition. Also, stone-chips may be weighed by weight sensors and the soluble materials can be filtered-out by passing the stone-chips through a water channel. A final check of the density of the mixture may be performed to determine the density of the mixture, and that reading may be transferred to the remote controller unit for acceptance and committal to the blockchain.

Figure 1D:
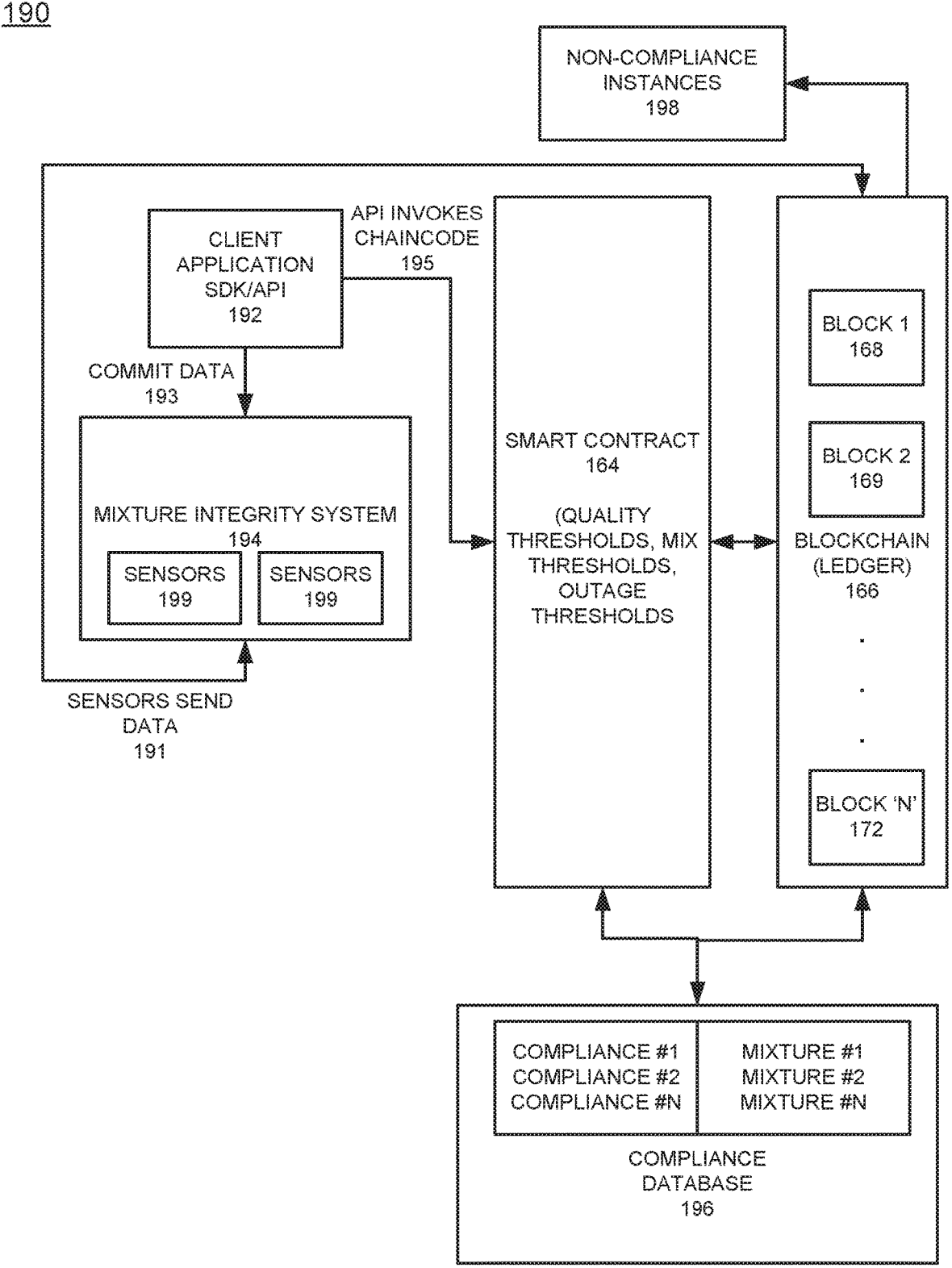
FIG. 1D illustrates another logic diagram of a data flow between entities associated with a civil project and a blockchain, according to example embodiments.

FIG. 1D illustrates another logic diagram of a data flow between entities associated with a civil project and a blockchain, according to example embodiments. Referring to FIG. 1D, the diagram 190 includes an example of information sharing between project entities and the blockchain and smart contract execution for identification of non-compliance instances. In this example, the source of information comes from the mixture integrity system 194 which is provided on-site via a communication protocol, such as Internet of things (IoT) or another sensor and communication medium that readily provides data updates in an ongoing cycle of measurements taken throughout project stages. The sensors 199 may detect data with regard to any civil project, in this example, the sensors are tracking a mixture balance of materials for a roadway or other structure. The sensors 199 detect and send data 191 to an interface gateway associated with a client machine and application 192, which uses a software development kit application programming interface configuration (SDK/API), and which is responsible for submitting and committing data 193 to the blockchain 166 as it is received via an API call operation. Also, the API may invoke a chaincode function 195 and other operations stored in the smart contract 164.

The operations of the smart contract 164 may provide performing checks to the compliance of predetermined thresholds assigned to the materials and the respective mixing and preparation processes. The smart contract 164 may reference thresholds stored in an external database 196 used for compliance measurements for the mixtures. The blockchain 166 may require consensus among peers to confirm the details of the data received and whether compliance is met or is failed. The smart contract may compare the sensor data received to the known thresholds and measurements to record a transaction of the event. The result of the transaction is stored in the blockchain and the subsequent measures taken may include a non-compliance instance message being created 198 to notify interested parties. Once the information is stored in the blockchain, the details of the mixtures identified may be stored in the compliance database 196.

Figure 2A:
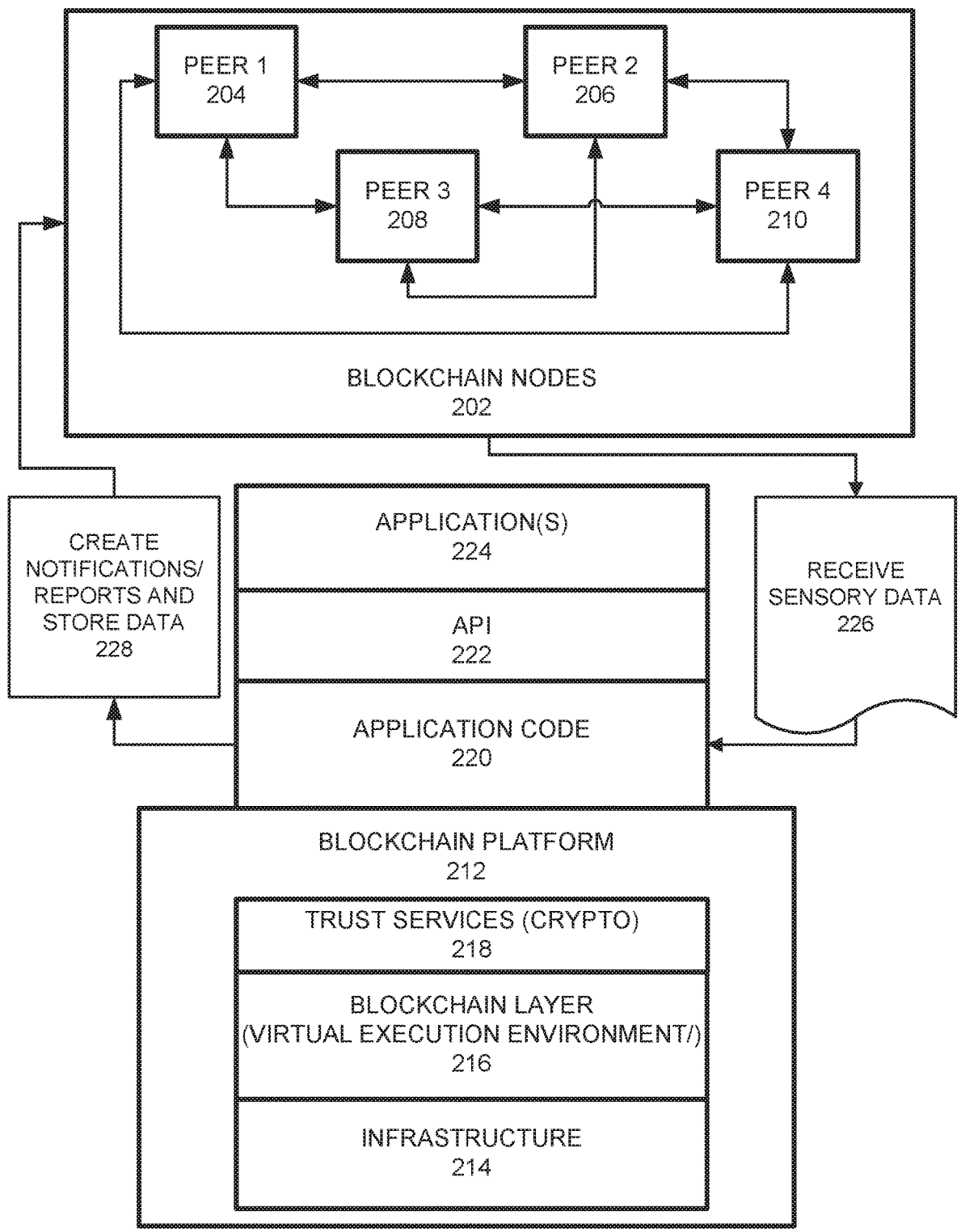
FIG. 2A illustrates an example peer node blockchain architecture configuration for tie-breaking consensus decisions, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (four nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications which are linked to application programming interfaces (APIs) to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain sensory data may be received 226 and processed with instructions in the smart contract application code. This may trigger a consensus decision with regard to identifying reports and notifying interested parties 228. The consensus may be performed to commit transactions for updates, failures, successes and other civil project information reports which must be kept in the immutable ledger during the civil project activities.

Figure 2B:
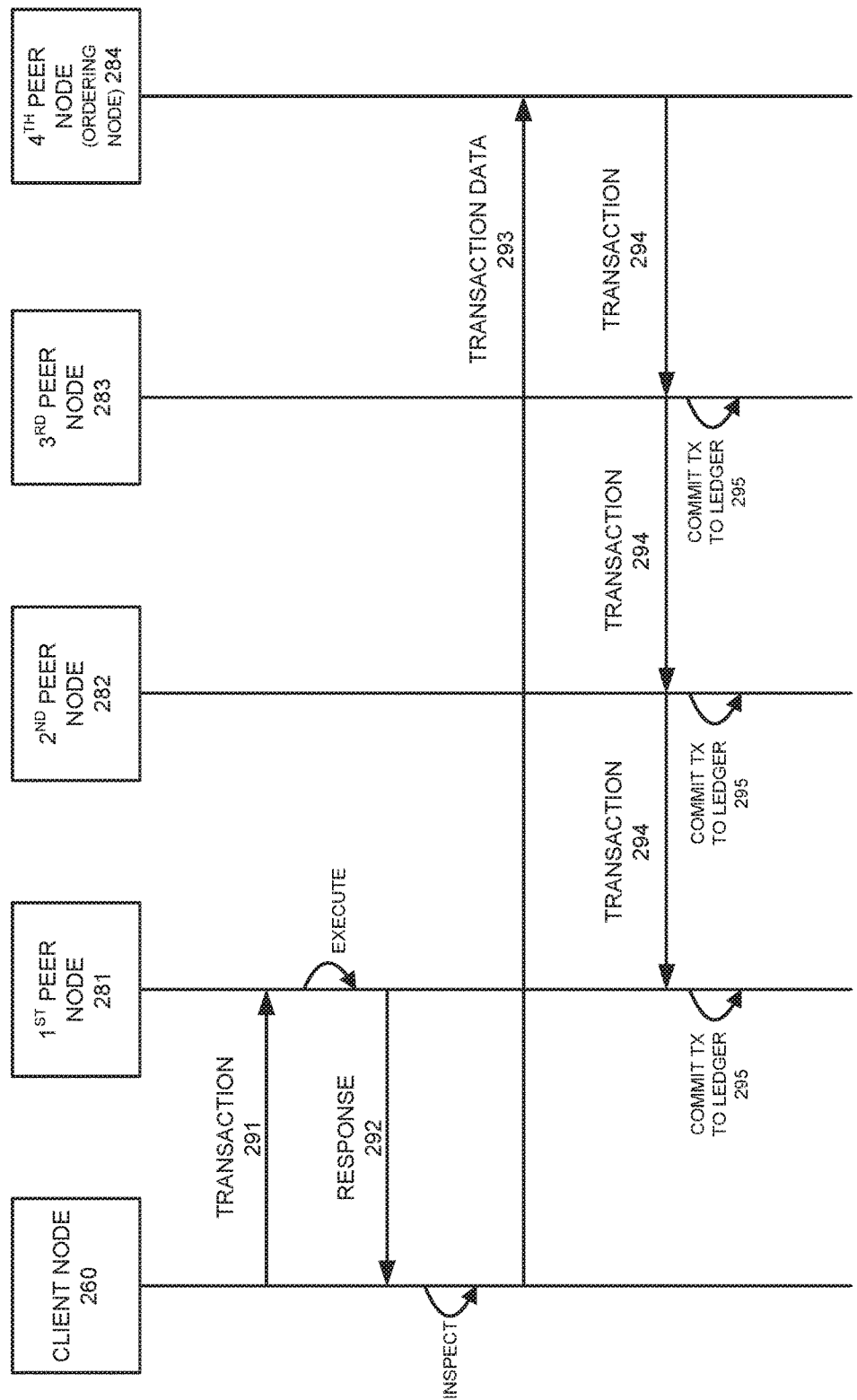
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
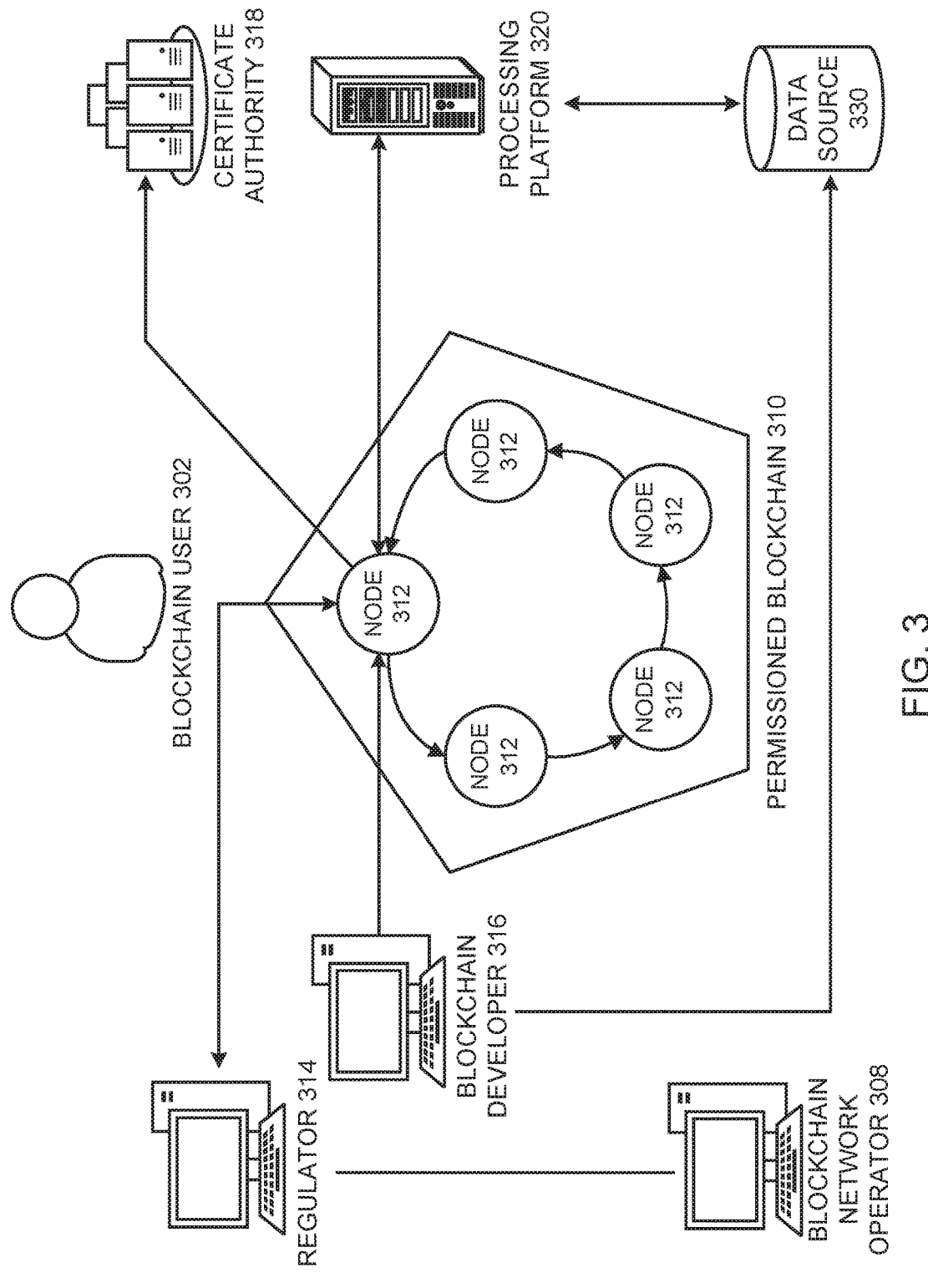
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator node 308 manages member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
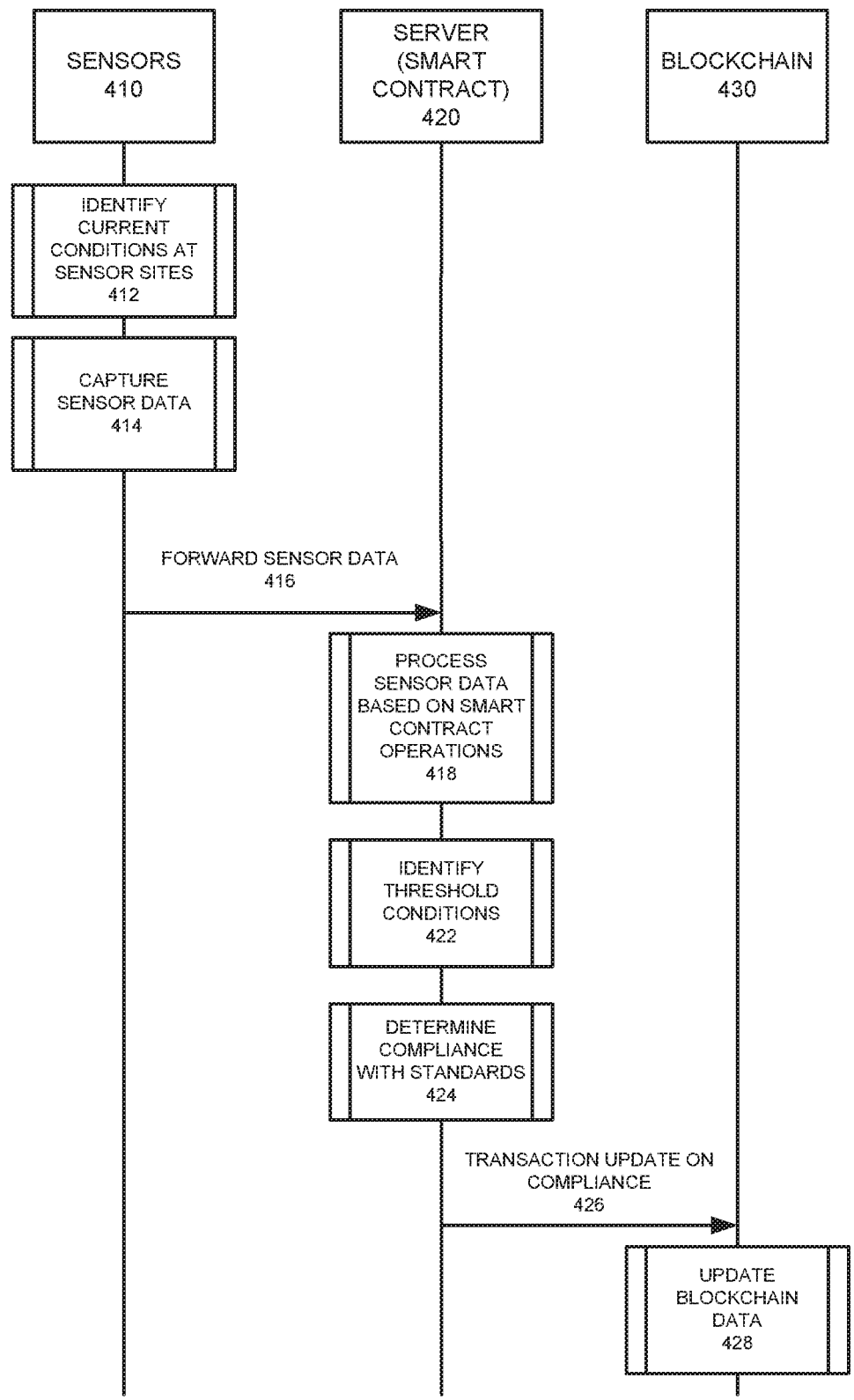
FIG. 4 illustrates a system messaging diagram for performing data processing of civil project sensory data via a smart contract and blockchain architecture, according to example embodiments.

FIG. 4 illustrates a system messaging diagram for performing data processing of civil project sensory data via a smart contract and blockchain architecture, according to example embodiments. Referring to FIG. 4, the configuration 400 includes sensors 410 which are operating at a job site to identify civil project mixtures, processes and other sensory data. The configuration also includes a smart contract 420 enacted to be processed on a controlling device and/or server, and a blockchain 430 as the immutable ledger managed by the peer nodes of the network. In one example method of operation, the sensors identify current conditions at sensor sites 412 and capture the data 414, which is then forwarded 416 to the smart contract processing entity. The information received is used as a basis for comparison and baseline management of smart contract operations 418. For example, the sensor data may be compared to operational thresholds 422 for mixture compositions, temperature, weight, etc. A determination regarding compliance is performed with known standards and threshold values noted by the smart contract 424. The determination of compliance vs. non-compliance is performed and a transaction update is performed 426 to reflect the compliance or non-compliance. Any compliance report may be generated and stored in the blockchain as an updated transaction 428. Also, any errors or invalid data reports, notifications or other countermeasures may also be logged in the blockchain.

Figure 5A:
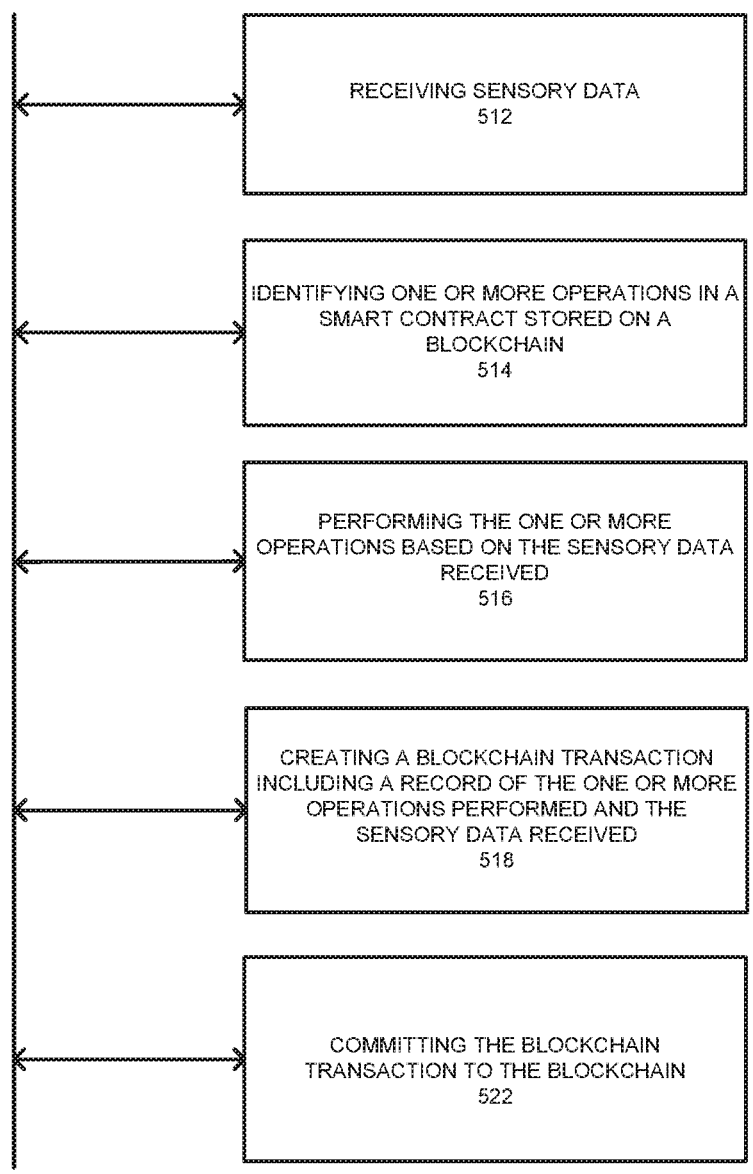
FIG. 5A illustrates a flow diagram of an example method of performing a civil project management procedure via a blockchain, according to example embodiments.

FIG. 5A illustrates a flow diagram of an example method of performing a civil project management procedure via a blockchain, according to example embodiments. Referring to FIG. 5A, the method 500 may include receiving sensory data 512, identifying one or more operations in a smart contract stored on a blockchain 514, performing the one or more operations based on the sensory data received 516, creating a blockchain transaction with a record of the one or more operations performed and the sensory data received 518, and committing the blockchain transaction to the blockchain 522.

The one or more operations may include comparing the sensory data to one or more sensory thresholds. The method may also include determining whether the sensory data is in compliance with a quality standard based on the comparison of the sensory data to the one or more sensory thresholds. When the sensory data is determined to not be in compliance with the quality standard, creating a notification, and transmitting the notification to a registered entity. An instruction to create the notification and the one or more sensory thresholds is stored in the smart contract. The sensory data includes one or more of a weight of materials, a mixture composition of the materials, a duration of mixing the materials, and a liquid density of the materials. The method may also include receiving an audit query from a registered entity member of the blockchain, and creating a report comprising the record of the one or more operations performed and the sensory data received.

Figure 5B:
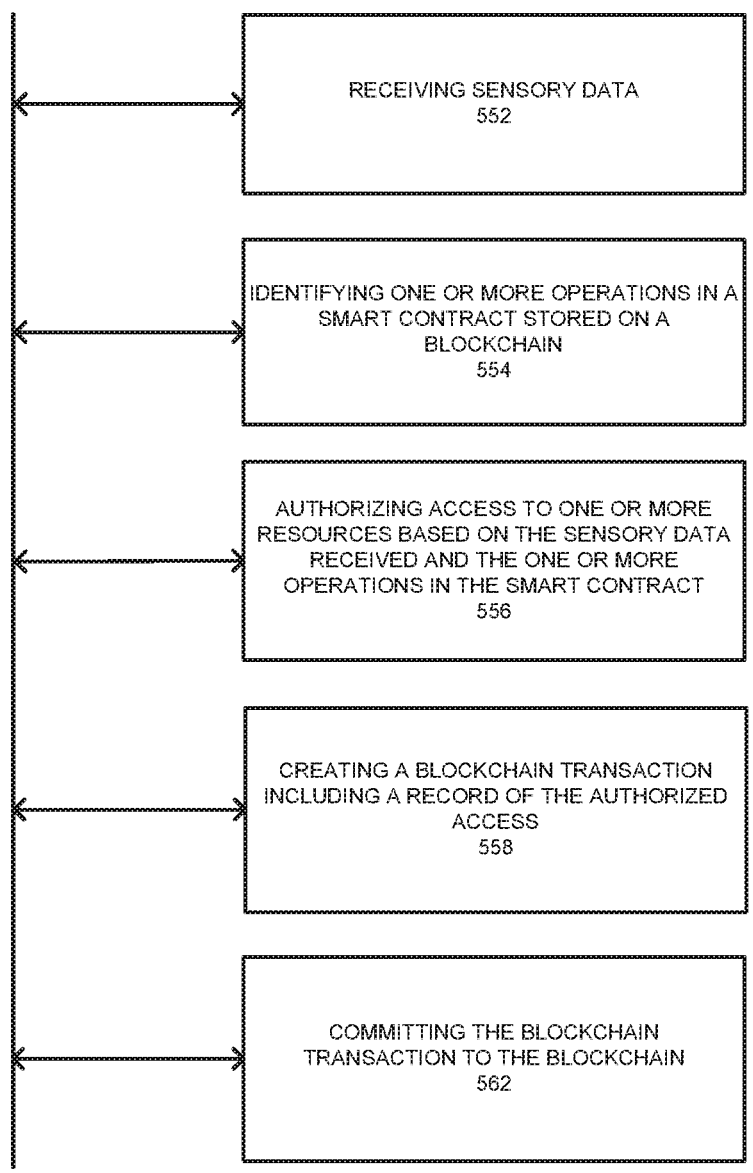
FIG. 5B illustrates a flow diagram of another example method of performing a civil project management procedure via a blockchain.

FIG. 5B illustrates a flow diagram of another example method of performing a civil project management procedure via a blockchain. The method 550 may include receiving sensory data 552, identifying one or more operations in a smart contract stored on a blockchain 554, authorizing access to one or more resources based on the sensory data received and the one or more operations in the smart contract 556, creating a blockchain transaction comprising a record of the authorized access 558, and committing the blockchain transaction to the blockchain 562.

In addition to the actions taken by the smart contract code based on sensory data received, comparisons and other information processing, project resources, capital equipment, and other secured entities may be authorized based on the sensory data received. For example, a labeled equipment or smartphone device may transmit an authorization via IoT to authorize a particular user with access to the equipment during a civil project. The user may be pre-authorized based on their smartphone device and when the device is brought within an area defined by the project specifications, a near-field communication (NFC) or other notification process may be sent to a local computing entity that identifies the user device and authorizes access to the capital resources, such as a machine. This also provides a log of devices present at a construction site so unauthorized entities are identified during the project. Any attempts to access such equipment may be logged and alerts may be sent when unauthorized entities are present at the project site.

Figure 6A:
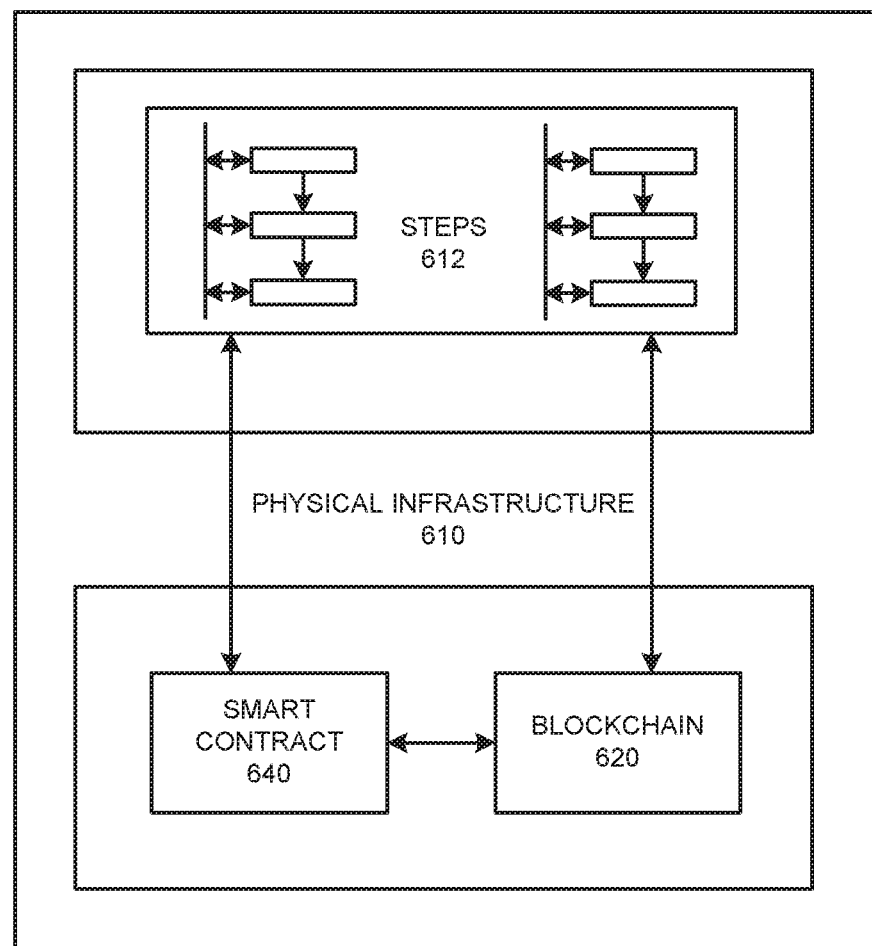
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
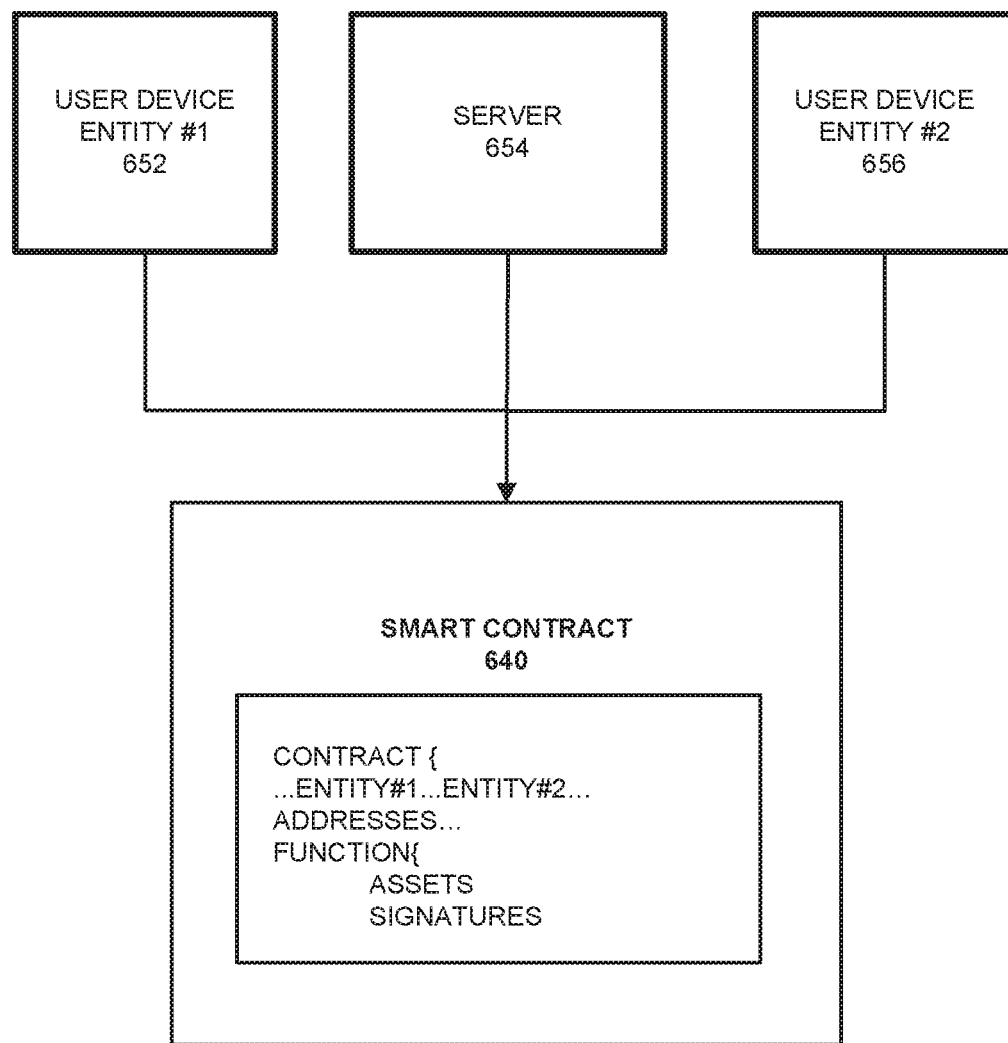
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
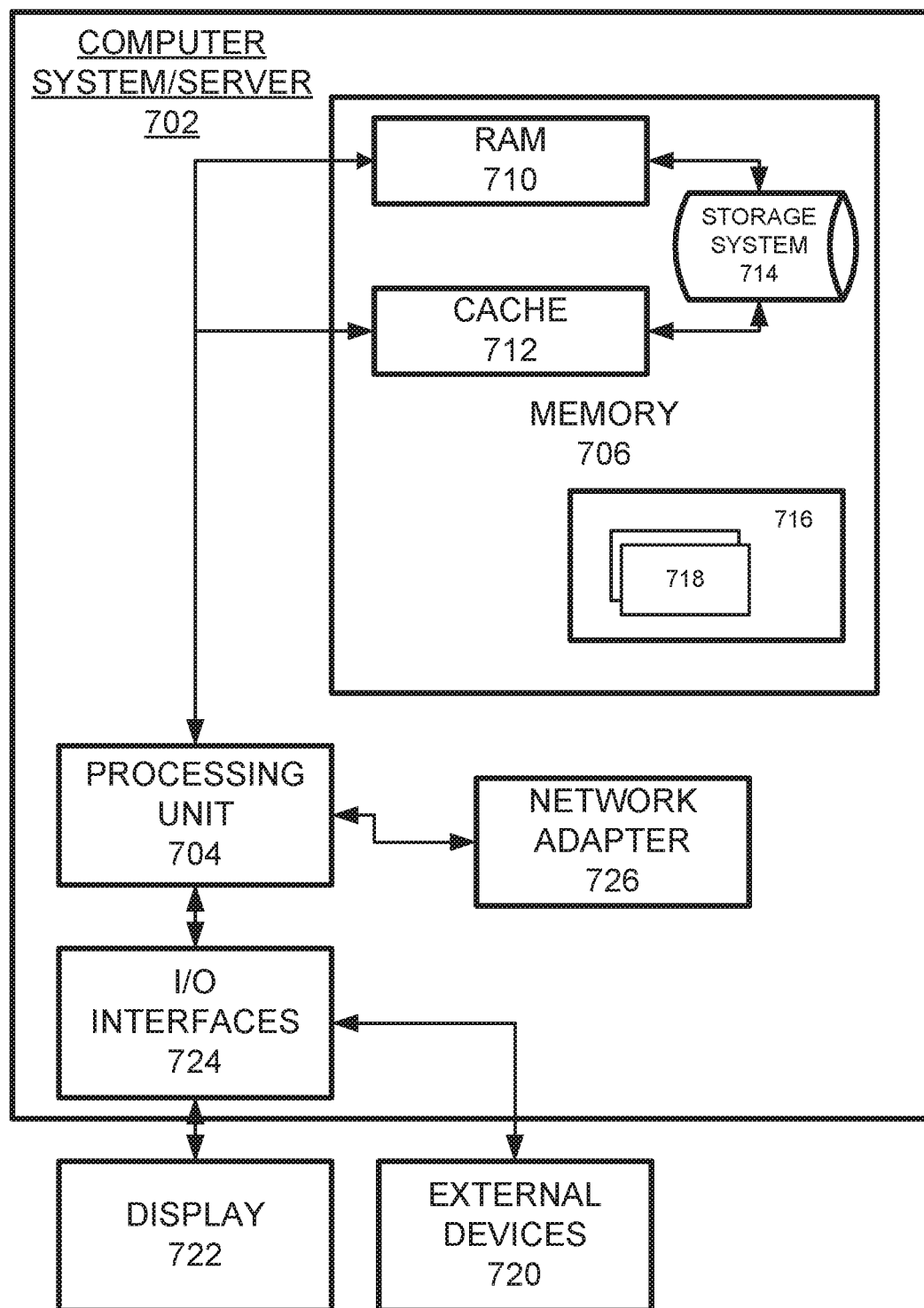
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving sensory data of a mixing process in which a mixture of materials are combined via a mixing machine, wherein the sensory data includes sensor readings of a plurality of materials prior to mixing and sensor readings of the mixture of materials after mixing by the mixing machine;
   determining, via logic of a smart contract of a blockchain, whether the plurality of materials prior to mixing and the mixture of materials after mixing complies with respective quality standards based on the received sensory data;
   executing a consensus among blockchain peers of the blockchain, wherein the blockchain peers confirm, via the executed consensus, the received sensory data and whether the plurality of materials prior to mixing and the mixture of materials after mixing complies with the respective quality standards;

creating a blockchain transaction comprising a record of the determination of whether the mixture of materials complies with the quality standard; and committing the blockchain transaction to the blockchain.

2. The method of claim 1, further comprising:
determining whether a ratio of materials within the mixture of materials is in compliance with predefined ratios of a quality standard of a civil project.

3. The method of claim 1, further comprising:
in response to determining that the mixture of materials is not in compliance with the quality standard, creating a notification and transmitting the notification to a registered entity.

4. The method of claim 3, wherein an instruction to create the notification is stored in the logic of the smart contract.

5. The method of claim 1, wherein the sensory data comprises a weight of the materials, a mixture composition of the materials, a duration of mixing the materials, and a liquid density of the materials.

6. The method of claim 1, further comprising:
receiving an audit query from a registered entity member of the blockchain; and
creating a report comprising the record of the determination of whether the mixture of materials complies with the quality standard.

7. An apparatus, comprising:
a receiver configured to receive sensory data of a mixing process in which a mixture of materials are combined via a mixing machine, wherein the sensory data includes sensor readings of a plurality of materials prior to mixing and sensor readings of the mixture of materials after mixing by the mixing machine;
a processor configured to
determine, via logic of a smart contract of a blockchain, whether the plurality of materials prior to mixing and the mixture of materials after mixing complies with respective quality standards based on the received sensory data;
execute a consensus among blockchain peers of the blockchain, wherein the blockchain peers confirm, via the executed consensus, the received sensory data and whether the plurality of materials prior to mixing and the mixture of materials after mixing complies with the respective quality standards;
create a blockchain transaction comprising a record of the determination of whether the mixture of materials complies with the quality standard; and
commit the blockchain transaction to the blockchain.

8. The apparatus of claim 7, wherein the processor is further configured to determine whether a ratio of materials within the mixture of materials is in compliance with predefined ratios of a quality standard of a civil project.

9. The apparatus of claim 7, wherein when the processor determines that the mixture of materials is not in compliance with the quality standard, the processor is further configured to create a notification and transmit the notification to a registered entity.

10. The apparatus of claim 9, wherein an instruction to create the notification is stored in the logic of the smart contract.

11. The apparatus of claim 7, wherein the sensory data comprises a weight of the materials, a mixture composition of the materials, a duration of mixing the materials, and a liquid density of the materials.

12. The apparatus of claim 7, wherein the receiver is further configured to receive an audit query from a registered entity member of the blockchain, and wherein the processor is further configured to create a report comprising the record of the determination of whether the mixture of materials complies with the quality standard.

13. A non-transitory computer readable storage medium configured to store instructions that when executed cause a processor to perform:
receiving sensory data of a mixing process in which a mixture of materials are combined via a mixing machine, wherein the sensory data includes sensor readings of a plurality of materials prior to mixing and sensor readings of the mixture of materials after mixing by the mixing machine;
determining, via logic of a smart contract of a blockchain, whether the plurality of materials prior to mixing and the mixture of materials after mixing complies with respective quality standards based on the received sensory data;
executing a consensus among blockchain peers of the blockchain, wherein the blockchain peers confirm, via the executed consensus, the received sensory data and whether the plurality of materials prior to mixing and the mixture of materials after mixing complies with the respective quality standards;
creating a blockchain transaction comprising a record of the determination of whether the mixture of materials complies with the quality standard; and
committing the blockchain transaction to the blockchain.

14. The non-transitory computer readable storage medium of claim 13, wherein the processor is further configured to perform:
determining whether a ratio of materials within the mixture of materials is in compliance with predefined ratios of a quality standard of a civil project.

15. The non-transitory computer readable storage medium of claim 13, wherein the processor is further configured to perform:
in response to determining that the mixture of materials is not in compliance with the quality standard, creating a notification and transmitting the notification to a registered entity.

16. The non-transitory computer readable storage medium of claim 15, wherein an instruction to create the notification is stored in the logic of the smart contract, and wherein the sensory data comprises a weight of the materials, a mixture composition of the materials, a duration of mixing the materials, and a liquid density of the materials.

17. The non-transitory computer readable storage medium of claim 13, wherein the processor is further configured to perform:
receiving an audit query from a registered entity member of the blockchain; and
creating a report comprising the record of the determination of whether the sensory data complies with the quality standard.

* * * * *